(12) United States Patent
Kanayama et al.

(10) Patent No.: US 7,801,915 B2
(45) Date of Patent: Sep. 21, 2010

(54) APPARATUS FOR MANAGING CONFIDENTIALITY OF INFORMATION, AND METHOD THEREOF

(75) Inventors: Hiroshi Kanayama, Yokohama (JP); Hiroshi Nomiyama, Kawasaki (JP); Koichi Takeda, Machida (JP)

(73) Assignee: International Business Machines Corporation, Armonk, NY (US)

( * ) Notice: Subject to any disclaimer, the term of this patent is extended or adjusted under 35 U.S.C. 154(b) by 697 days.

(21) Appl. No.: 11/528,932

(22) Filed: Sep. 27, 2006

(65) Prior Publication Data

US 2007/0073698 A1 Mar. 29, 2007

(30) Foreign Application Priority Data

Sep. 27, 2005 (JP) ............................ 2005-280149

(51) Int. Cl.
*G06F 7/00* (2006.01)
(52) U.S. Cl. .......................................... 707/783; 726/28
(58) Field of Classification Search ....................... None
See application file for complete search history.

(56) References Cited

U.S. PATENT DOCUMENTS

| 7,222,299 | B1* | 5/2007 | Lim et al. ................... 715/273 |
| 2005/0131677 | A1* | 6/2005 | Assadollahi ................ 704/201 |
| 2005/0131900 | A1* | 6/2005 | Palliyll et al. ................ 707/10 |
| 2005/0171914 | A1* | 8/2005 | Saitoh ......................... 705/51 |
| 2005/0210083 | A1* | 9/2005 | Kodama ...................... 707/205 |
| 2006/0005247 | A1* | 1/2006 | Zhang et al. ................... 726/26 |

FOREIGN PATENT DOCUMENTS

| JP | 09-044432 | 2/1997 |
| JP | 2001-101054 | 4/2001 |
| JP | 2002-014862 | 1/2002 |
| JP | 2005-099944 | 4/2005 |
| JP | 3705439 B1 | 10/2005 |

OTHER PUBLICATIONS http://www.quality.co.jp/products/eXPDS/, Quality Corporation, pp. 1-2 (Oct. 1, 2006).
http://internet.watch.impress.co.jp/cda/news/2005/03/09/6780. html, Word & Excel & Powerpoint 2007, pp. 1-2 (Oct. 1, 2006).
http://www.klabsecurity.com/, KLab Security, pp. 1-3 (Oct. 1, 2006).
http://userpages.umbc.edu/~mabzug1/cs/md5/md5.html, MD5 Homepage (unofficial) pp. 1-3, (Oct. 1, 2006).

\* cited by examiner

*Primary Examiner*—John R. Cottingham
*Assistant Examiner*—Nicholas E Allen
(74) *Attorney, Agent, or Firm*—Ido Tuchman; Kenneth R. Corsello

(57) ABSTRACT

An apparatus which manages confidentiality of information. This apparatus includes: a recording unit operable to record information in association with a history of users having accessed the information, or, with access rights defining users able to access the information; a generating unit operable to generate management information indicating whether the information should be managed confidentially from users not permitted to access the information; a selecting unit operable to select, based on the history or access rights, users able to access the information; and a notifying unit operable to notify the selected users of the generated management information in association with identification information of the information.

22 Claims, 15 Drawing Sheets

FIG. 3

RECEIVED MAILBOX — 200

| DESTINATION ADDRESS | | SENDER | TITLE | ATTACHMENT | BODY |
| --- | --- | --- | --- | --- | --- |
| TO: | CC: | | | | |
| SATO@AAA.COM | XXX@AAA.COM | ZZZ@AAA.COM | REGARDING CORRECTION IN NAME LIST | NAME.TXT | THANK YOU FOR TODAY... |
| AAA@AAA.COM | SATO@AAA.COM | WWW@AAA.COM | SALES DOCUMENT A | DOCA.TXT | I AM SENDING XX... |
| ... | ... | ... | ... | ... | ... |
| QQQ@AAA.COM | SATO@AAA.COM | SATO@AAA.COM | SALES DOCUMENT B | DOCB.TXT | AS FOLLOWS, THE DOCUMENT... |
| ... | ... | ... | ... | ... | ... |

| FOLDER | FILE | ACCESS RIGHTS |
|---|---|---|
| SALES_INFO | DOCA.TXT<br>DOCB.TXT<br>⋮ | SALES_GROUP,EXECTIVE_GROUP |
| PRIVATE | NAME.TXT<br>⋮ | SATO, XXX, ZZZ |
| ⋮ | ⋮ | ⋮ |

```
<?xml version="1.0" encoding="shift_jis" ?>
<csd>
 <sensitiveDocuments>
  <doc>
   <originalHash>31ddf6a8c949377f04f4edff86888335</originalHash>     ⎫
   <normalizedHash>f336311bc9d69a44244d8a9387515286</normalizedHash> ⎬ 500
   <record>
    <record hash="6317b8257b587335c160da1fe72d66da"/>   ⎫ 510
    <record hash="f6b8ab962eacce365d3ddf265a860002f"/>  ⎭
   </record>
   <references>
    <ref "hash"="a1f4fb0ce38f91ee20ac3ec5ea028495"/>    ⎫
    <ref "hash"="24d14782ef5493404 5ea2c01417848a6"/>   ⎬ 520
    <ref "hash"="85178ada165f65849ec73968e0aa32a0"/>    ⎪
    <ref "hash"="ca640d24aca765abdac7768e20ed8593"/>    ⎭
   </references>
  </doc>
 </sensitiveDocuments>
</csd>
```

LIST OF SUBJECT INFORMATION LIKELY TO CONTAIN PERSONAL INFORMATION

PLEASE SELECT CONFIDENTIAL INFORMATION

| CHECK | FILE NAME | NUMBER OF TIMES WHEN IT HAS BEEN MANAGED CONFIDENTIALLY | A PERCENTAGE OF PERSONAL INFORMATION NOTIFICATION |
|---|---|---|---|
| ☐ | DOCA.TXT | 5 | 80% |
| ☑ | DOCB.TXT | — | 33% |
| ⋮ | ⋮ | ⋮ | ⋮ |

NOTIFICATION

FIG. 9

(a) IN CASE OF TEXT FILE (CUSTOMER NAME LIST.TEXT)

| | | |
|---|---|---|
| ICHIRO TANAKA | MINATO-KU TOKYO | 03-1234-56XX |
| JIRO TANAKA | CHIYODA-KU TOKYO | 03-1234-99YY |

(b) IN CASE OF TABULAR FILE (CUSTOMER NAME LIST.XLS)

| NAME | ADDRESS | TELEPHONE NUMBER |
|---|---|---|
| ICHIRO TANAKA | MINATO-KU TOKYO | 03-1234-56XX |
| JIRO TANAKA | CHIYODA-KU TOKYO | 03-1234-99YY |

(c)

| LAST NAME | FIRST NAME | ADDRESS | TELEPHONE NUMBER |
|---|---|---|---|
| TANAKA | ICHIRO | MINATO-KU TOKYO | 03-1234-56XX |
| TANAKA | JIRO | CHIYODA-KU TOKYO | 03-1234-99YY |

FIG. 10

(a) Document 1

PASSWORD OF YOUR ID XXXX is updated.
New password is yyyy.

(b) Document 2

ID and PASSWORD for access are as follows.
ID : xxxx
Password : yyyy (c)

ID : xxxx , Password : yyyy

| LAST NAME | FIRST NAME | ADDRESS | TELEPHONE NUMBER | DRIVER'S LICENSE ID |
|---|---|---|---|---|
| SAITO | ICHIRO | TOKYO ···· | 03-1234-56XX | XXYYZZ |
| SAITO | JIRO | TOKYO ···· | 03-1234-99XX | WWPPQQ |

(b)

| LAST NAME | FIRST NAME | ADDRESS | TELEPHONE NUMBER | DRIVER'S LICENSE ID |
|---|---|---|---|---|
| SAITOU | ICHIRO | TOKYO ···· | 03-1234-56XX | XXYYZZ |
| SAITO | JIRO | TOKYO ···· | 03-1234-99YY | — |

FIG. 12

APPARATUS FOR MANAGING CONFIDENTIALITY OF INFORMATION, AND METHOD THEREOF

CROSS-REFERENCE TO RELATED APPLICATIONS

This application claims priority under 35 U.S.C. §119 to Japanese Patent Application No. 2005-280149 filed Sep. 27, 2005, the entire text of which is specifically incorporated by reference herein.

BACKGROUND OF THE INVENTION

The present invention relates to an apparatus for managing confidentiality of information, and a method thereof. In particular, the present invention relates to an apparatus which detects confidential information from information recorded in the apparatus, and a method thereof.

In recent years, management of confidential information such as personal information has become an important challenge, and development of legal systems regarding the management thereof has been in progress. For the purpose of building up a system which manages confidential information by using an information processing apparatus, it is required to specify which information is confidential one from information already recorded in the information processing apparatus, in advance. For this requirement, techniques for detecting a file which includes confidential information have been proposed (refer to: dgiberry "My Privacy" related information, http://internet.watch.impress.co.jp/cda/news/2005/03/09/6780.html; quality "eX PDS" webpage, http://www.quality.co.jp/products/eXPDS/; and KLab "p-pointer" webpage, http://p-pointer.klab.org/). According to these techniques, it becomes possible to appropriately detect confidential information such as personal information from information recorded in a certain information processing apparatus.

A reference, MD5 Homepage (unofficial), http://userpages.umbc.edu/-mabzugl/cs/md5/md5.html, will be described later.

The aforementioned techniques are techniques which detect confidential information from the inside of one environment (for example, a single information processing apparatus, one server apparatus, or the like). Accordingly, in a case where confidential information has been detected in a certain information processing apparatus, even if the same information as the above is recorded in a different information processing apparatus, the same information has to be detected over again in the different information processing apparatus independently. Thus, conventionally, it has not been possible to efficiently detect confidential information from a plurality of information processing apparatuses.

Note that the aforementioned summary of the invention does not list all of characteristics necessary for the present invention, and that a sub-combination of groups of these characteristics can be the invention.

BRIEF SUMMARY OF THE INVENTION

One exemplary aspect of the invention is an apparatus which manages confidentiality of information. The apparatus includes a recording unit operable to record information in association with any one of a history of users having accessed the information, and access rights defining users authorized to access the information. A generating unit is operable to generate management information indicating whether the information should be managed confidentially from a certain user. A selecting unit is operable to select users able to access the information, based on any one of the history and the access rights. Furthermore, a notifying unit is operable to notify the selected users of the generated management information in association with identification information of the information.

Another exemplary aspect of the invention is a system that includes a plurality of apparatuses respectively used by different users, and which manages confidentiality of information recorded in the plurality of apparatuses. Each of the apparatuses includes a recording unit operable to record information in association with any one of a history of users having accessed the information, and access rights defining users authorized to access the information, a receiver operable to receive, from another one of the apparatuses provided corresponding to different users, management information indicating whether the information should be managed confidentially, in association with hash values of the information, a comparing unit operable to compare hash values of information recorded in the recording unit with the received hash values in response to receipt of management information of the information in the receiver, a selecting unit operable to select users able to access the information, based on any one of the history and access rights, and a notifying unit operable to notify the selected users of the generated management information in association with identification information of the information.

Yet another exemplary aspect of the invention is a method for implementing at least any one of functions in one apparatus of a plurality of apparatuses constituting a system. The method includes a recording operation for recording user information, which contains a plurality of information items, in association with any one of a history of users having accessed the user information, and access rights defining users authorized to access the user information. A receiving operation receives management information, which indicates whether the user information should be managed confidentially, in association with hash values of the user information, from another one of the apparatuses provided to different users. A comparing operation compares hash values of the user information recorded in the recording unit with the received hash values in response to receipt of management information of the user information. A generating operation generates the management information indicating whether the user information should be managed confidentially, based on the received management information, on condition that the hash values compared by the comparing unit coincide with each other. A selecting operation selects users able to access the user information based on any one of the recorded history and the recorded access rights. A notifying operation notifies the users of the generated management information in association with identification information of the user information, in order to cause the user information to be managed by the selected users in accordance with the generated management information.

A further exemplary embodiment of the present invention is a method of managing confidentiality of user information by use of an apparatus which manages confidentiality of the user information. The apparatus includes a recording unit operable to record information in association with any one of a history of users having accessed the user information, and access rights defining users authorized to access the user information. The method includes the steps of generating management information indicating whether the user information should be managed confidentially from a certain user, selecting users able to access the user information, based on any one of the history and the access rights recorded in the recording unit, and notifying the users of the generated management information in association with identification information of the user information.

An additional embodiment of the present invention is a program which causes an information processing apparatus to function as an apparatus which manages confidentiality of user information. The program includes a recording unit operable to record information in association with any one of a history of users having accessed the user information, and access rights defining users able to access the user information; a generating unit operable to generate management information indicating whether the user information should be managed confidentially from certain users; a selecting unit operable to select a user able to access the user information based on any one of the history and the access rights; and a notifying unit operable to notify the selected users of the generated management information in association with identification information of the user information.

BRIEF DESCRIPTION OF THE SEVERAL VIEWS OF THE DRAWINGS

For a more complete understanding of the present invention and the advantages thereof, reference is now made to the following description taken in conjunction with the accompanying drawings.

FIG. 3 shows a specific example of a data structure of a recording unit 200 (a first example).

FIG. 4 shows another specific example of a data structure of the recording unit 200 (a second example).

FIG. 5 shows an example of a data structure of a notification 50.

FIG. 9 shows an example of a screen display at the time of making the inquiry about whether management information should be generated, in S830.

FIG. 10 shows a specific example of normalization of information (a first example).

FIG. 11 shows another specific example of the normalization of information (a second example).

FIG. 12 shows a specific example of a processing for comparing whether hash values of information coincide with each other, in S810.

DETAILED DESCRIPTION OF THE INVENTION

Hereinbelow, the present invention will be described through an embodiment of the invention. The following embodiment, however, does not limit the invention defined in the scope of claims, and it is not necessarily the case that all of combinations of characteristics described in the embodiment are essential for solution means of the invention.

Figure 1:
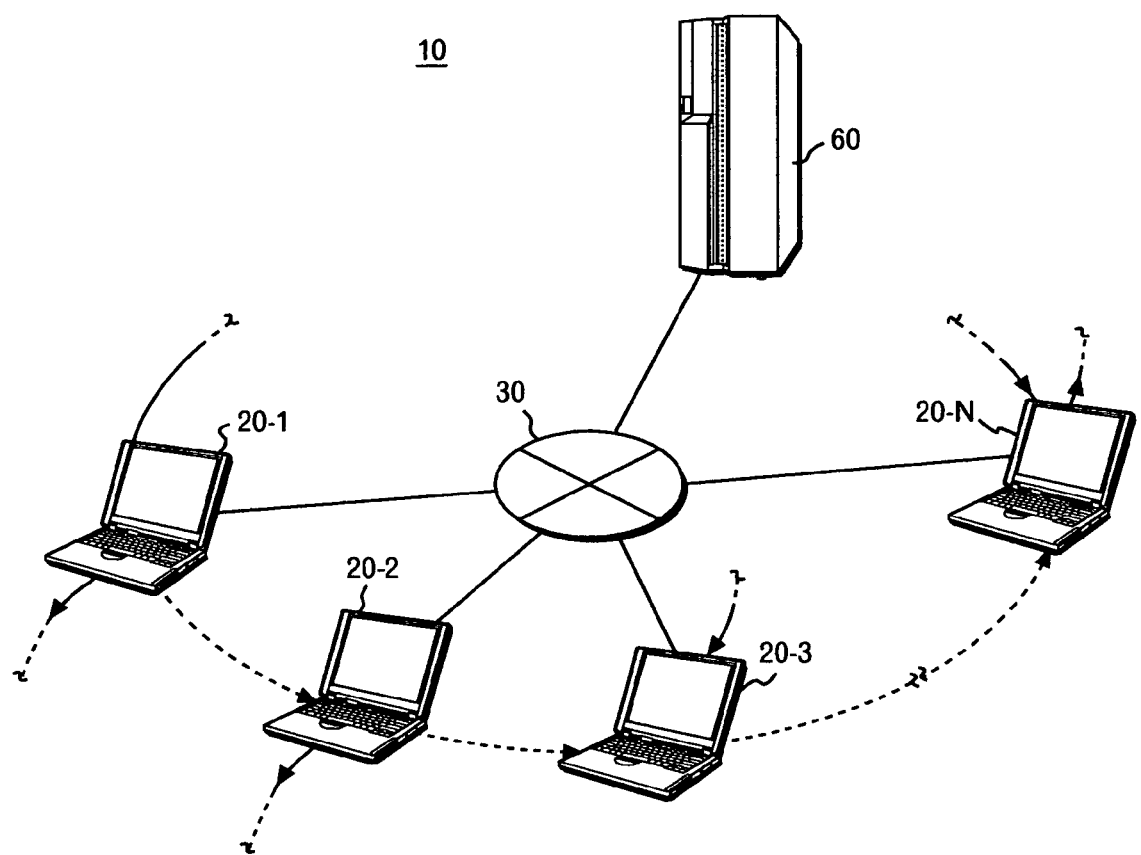
FIG. 1 shows a general configuration of an information processing system 10.

FIG. 1 shows a general configuration of an information processing system 10. The information processing system 10 includes information processing apparatuses 20-1 to 20-N, and a server apparatus 60. The information processing apparatuses 20-1 to 20-N are connected to one another through a communication network 30, and are also connected respectively to the server apparatus 60 through the communication network 30. Additionally, each of the information processing apparatuses 20-1 to 20-N has a recording apparatus (for example, a recording unit 200 described later) which is independent from the other information-processing apparatuses, and records information in the recording apparatus. Moreover, the respective information processing apparatuses 20-1 to 20-N are provided to and used by respective different users, and are used by the different users.

A certain information processing apparatus (for example, the information processing apparatus 20-1) determines whether user information recorded therein should be managed confidentially based on instructions of a user. It is noted that user information (also referred to herein as simply "information") may contain any information, and is not limited to information about the user. Then, the information processing apparatus 20-1 generates management information indicating whether the user information should be managed confidentially, and notifies of the management information another information processing apparatus (for example, the information processing apparatus 20-2) provided to another user able to access the information. The information processing apparatus 20-2, which has received this notification, determines whether information coinciding with the information recorded in the information processing apparatus 20-1 is recorded therein.

If such information is recorded, the information processing apparatus 20-2 determines, based on the management information which it has been notified of, whether the information recorded therein should be managed confidentially. Thereafter, the information processing apparatus 20-2 generates management information indicating whether the information recorded therein should be managed confidentially, and then, notifies another information processing apparatus (for example, the information processing apparatus 20-3) of the management information. Additionally, the server apparatus 60 manages the number of times when management information indicating whether information should be managed confidentially is generated in each of the information processing apparatuses 20-1 to 20-N. Each of the information processing apparatuses 20-1 to 20-N may determine, based on the number of times, whether the information should be managed confidentially.

As described above, by allowing the information processing apparatuses 20-1 to 20-N and server apparatus 60 to work in collaboration with each other, the information processing system 10 according to this embodiment aims at managing confidential information efficiently as compared with a case where each of the information processing apparatuses 20-1 to 20-N manages confidentiality of information independently.

Hereinafter, for the purpose of describing functions of each of the information processing apparatuses 20-1 to 20-N, functions of the information processing apparatus 20-2 will be described on behalf of the information processing apparatuses 20-1 to 20-N. Specifically, a description will be given of a process in which: the information processing apparatus 20-2 manages confidentiality of information spontaneously, or, the information processing apparatus 20-2 manages confidentiality of information upon receipt of a notification from the information processing apparatus 20-1; and furthermore, the information processing apparatus 20-2 notifies the information processing apparatus 20-3 of management information. Note that, instead of this process, or in addition to this process, the information processing apparatus 20-2 may be notified by an information processing apparatus other than the information processing apparatus 20-1, and may notify of the management information an information processing apparatus other than the information processing apparatus 20-3. Additionally, since each of the information processing apparatuses 20-1, and 20-3 to 20-N has substantially the same functions as the information processing apparatus 20-2, descriptions for each of them will be omitted except for different points.

Figure 2:
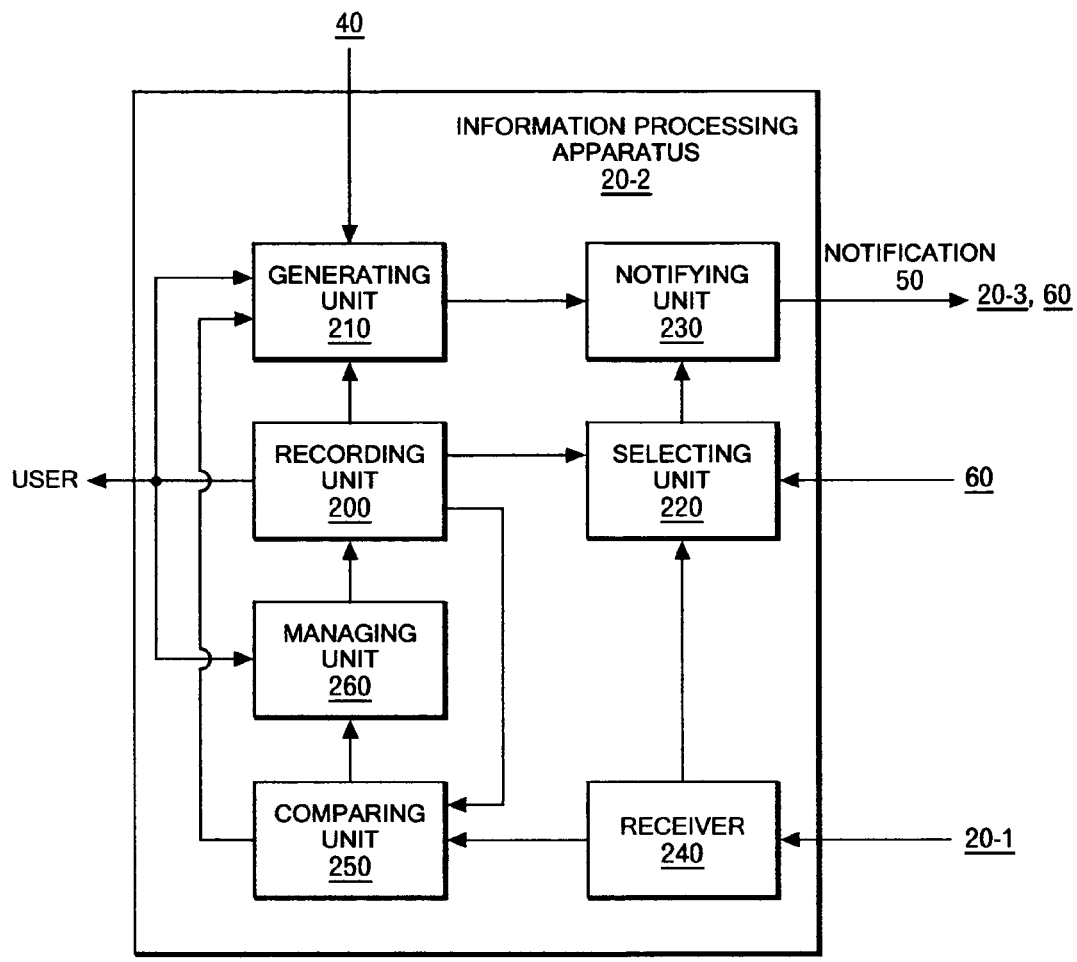
FIG. 2 shows a functional configuration of the information processing apparatus 20-2.

FIG. 2 shows a functional configuration of the information processing apparatus 20-2. The information processing apparatuses 20-2 includes the recording unit 200, a generating unit 210, a selecting unit 220, a notifying unit 230, a receiver 240, a comparing unit 250, and a managing unit 260. The recording unit 200 respectively records at least one piece of information, in association with a history of users who have accessed the information, or with access rights defining users able to access the information. The recording unit 200 outputs or updates the information recorded therein in response to instructions of users.

Here, the information recorded in the recording unit 200 means a unit of storage, for example, such as a file or a folder, in a recording apparatus. Instead of this, the information may be data, such as an electronic mail, managed independently from a file. Hereinafter, this information recorded in the recording unit 200 will be referred to as "subject information".

The generating unit 210 generates management information indicating whether subject information should be managed confidentially from users not permitted to access the subject information. For example, the generating unit 210 may detect personal information from the inside of the recording unit 200 by using an existing method of detecting personal information, and then may determine that subject information including the detected personal information should be managed confidentially. In this case, the generating unit 210 generates management information indicating that the subject information should be managed confidentially. Here, to manage subject information confidentially means to appropriately treat the subject information as confidential information. Specifically, the subject information may be entered in a management register used for managing confidential information, or the subject information may be deleted. Additionally, the generating unit 210 may acquire, through input by a user, an instruction indicating that the subject information does not have to be managed confidentially. In this case, the generating unit 210 may generate management information indicating the above.

The selecting unit 220 selects, based on the history or access rights recorded in the recording unit 200, users able to access the subject information. On condition that the subject information recorded in the recording unit 200 is included in any one of databases recorded in the server apparatus 60, the selecting unit 220 may further selects users authorized to access the database.

So as to make the subject information to be managed by the selected users in accordance with the management information of the subject information, the notifying unit 230 notifies the users of the management information in association with identification information of the subject information. Here, the identification information of the subject information is, for example, a hash value obtained as a result of inputting a file, which is the subject information, into a hash function which is a one-way function. These contents of the notification will be referred to as a notification 50, and will be described with FIG. 5.

Hereinabove, a description has been given of a function in which the information processing apparatus 20-2 notifies another information processing apparatus of the management information as a starting point in notification of the management information. Next, a description will be given of a functional configuration of a case where, when the information processing apparatus 20-2 has received a notification from the information processing apparatus 20-1, the information processing apparatus 20-2 further notifies the information processing apparatus 20-3 based on the notification.

The receiver 240 receives, from the notifying unit 230 of the information processing apparatus 20-1, management information of subject information in association with a hash value of the subject information, and with notification information indicating a group of users who already have been notified of the management information. In response that the receiver 240 receives the management information, the comparing unit 250 compares a hash value of the information recorded in the recording unit 200 with the received hash value. The hash value of the information recorded in the recording unit 200 may be recorded in the recording unit 200 in advance, or may be generated by the comparing unit 250 in every comparison. On condition that the hash values compared by the comparing unit 250 coincide with each other, the generating unit 210 generates, based on the received management information, management information indicating whether the subject information should be managed confidentially. For example, on the condition that the users are obliged to input for confirmation, the generating unit 210 may generate management information identical to the received management information. Specifically, if it is notified that the subject information should be managed confidentially, the generating unit 210 generates the management information indicating that the subject information should be managed confidentially. On the other hand, if it is notified that there is no need to keep the subject information confidential, the generating unit 210 generates the management information indicating that there is no need to keep the subject information confidential.

The selecting unit 220 selects users able to access the subject information based on the history or the access rights recorded in the recording unit 200. Then, the selecting unit 220 excludes users indicated by the notification information from a group of the selected users. In association with notification information in which the user of the information processing apparatus 20-2 is added to the received notification information, and with a hash value of the subject information, the notifying unit 230 notifies of the generated management information the user selected by the selecting unit 220.

The managing unit 260 manages the subject information based on comparison results of the comparing unit 250, or based on instructions of the users. For example, the managing unit 260 may record subject information determined to be managed confidentially, in association with the management information that the subject information should be managed confidentially. Otherwise, the managing unit 260 may delete subject information determined to be managed confidentially from the recording unit 200. Additionally, the managing unit 260 may perform such management as described here with consent of the users.

FIG. 3 shows a specific example of a data structure of the recording unit 200 (a first example). With this drawing, a specific example will be described regarding a case where the recording unit 200 functions as a mailbox of electronic mail. The recording unit 200 records, as subject information, an electronic mail received by the user of the information processing apparatus 20-2. Then, the recording unit 200 records a destination address and a sender as the history of the users having accessed the electronic mail, or as access rights to the electronic mail.

The specific data structure is such that, with respect to each electronic mail, the recording unit 200 records the destination address, the sender, a title, an attachment, and a body of electronic mail. In the example of this drawing, the information processing apparatus 20-2 is provided to a user whose electronic mail address is "sato@AAA.com". Accordingly, the recording unit 200 records electronic mails addressed to "sato@AAA.com". That is, for example, in the first line, the recording unit 200 records an electronic mail which has a destination address being "sato@AAA.com", a destination of carbon copy being "XXX@AAA.com", a sender being "ZZZ@AAA.com", a title being "Regarding correction in a name list," an attachment being "NAME.TXT", and a body of electric mail starting with "Thank you for today . . . ".

Here, the sender transmits the body of electric mail and the attachment to the user of the destination address. Additionally, the user of the destination address receives the body of electric mail and the attachment from the sender. Accordingly, the sender of this electronic mail and the user of the destination address are considered to have already seen the electronic mail and the attachment, or to be in a state permitted to access these electronic mail and attachment. Thus, a sender and a destination address of an electronic mail act as a history of accesses to subject information, or as access rights to the subject information.

FIG. 4 shows another specific example of the data structure of the recording unit 200 (a second example). In this example, the recording unit 200 has a storage region accessible from the other information processing apparatuses through the communication network 30. In addition, this storage region is, for example, a folder set up to be accessible from users of the other information processing apparatuses. The recording unit 200 records a plurality of files in the storage area. Specifically, the recording unit 200 records a file "DOCA.TXT" and a file "DOCB.TXT" in a folder "SALES_INFO".

There, for the folder "SALES_INFO", names of groups of users able to access the folder, that is, "SALES_GROUP (for example, a sales department)" and "EXECUTIVE_GROUP (for example, executives)" are set up as access rights to this folder. To be more precise, employees belonging to the sales department, and the executives can access this folder "SALES_INFO". On the other hand, for a folder "PRIVATE", login IDs "SATO", "XXX" and "ZZZ" of users able to access the folder are set up as access rights to this folder. That is, three people, "SATO", "XXX", and "ZZZ" can access this folder "PRIVATE".

In the example of this drawing, a user having an access right to a certain folder can access all of files in the folder. Accordingly, the access right to the folder corresponds to an access right to the files contained in the folder. In other words, in the example of this drawing, the access right to the folder acts as the access right to the files contained in the folder.

FIG. 5 shows an example of a data structure of the notification 50. As exemplified in this drawing, the notifying unit 230 transmits the notification 50 as a tagged document in the XML format or the like. The notification 50 includes management information 500 indicating whether subject information should be managed confidentially; identification information 510 indicating identification information of the subject information; and notification information 520 indicating a group of users already notified of the management information. Specifically, the management information 500 is a tag "<sensitiveDocuments>" indicating that the subject information should be managed confidentially.

The identification information 510 includes, in particular, a hash value generated from the subject information through a one-way function. Thereby, it can be made more difficult for an eavesdropper of a communication and a user at a notification destination to infer a content of the communication based on identification information thereof. In addition, the identification information 510 may contain not only the hash value of the subject information itself but also a hash value of the normalized subject information, and a hash value of each of items contained in the subject information. In the example of this drawing, the hash value of the subject information itself is tagged with a tag "<originalHash>". Additionally, the hash value of the normalized subject information is tagged with a tag "<normalizedHash>", and the hash value of each of the items contained in the subject information is tagged with a tag "<records>".

The notification information 520 includes, specifically, a hash value of identification information on a user already notified of the management information. Thereby, it can be made more difficult to leak information on who are users knowing and being in a position to know the subject information, the information being as important as the subject information itself. In the example of this drawing, in the first line of the notification information 520, a hash value of identification information (for example, "ZZZ@AAA.COM" which is the mail address shown in FIG. 3) of a first user is written. On the other hand, in the second line of the notification information 520, a hash value of identification information (for example, "XXX@AAA.COM" which is the mail address shown in FIG. 3) of a second user is written. This example shows that four users have been already notified of the management information.

Figure 6:
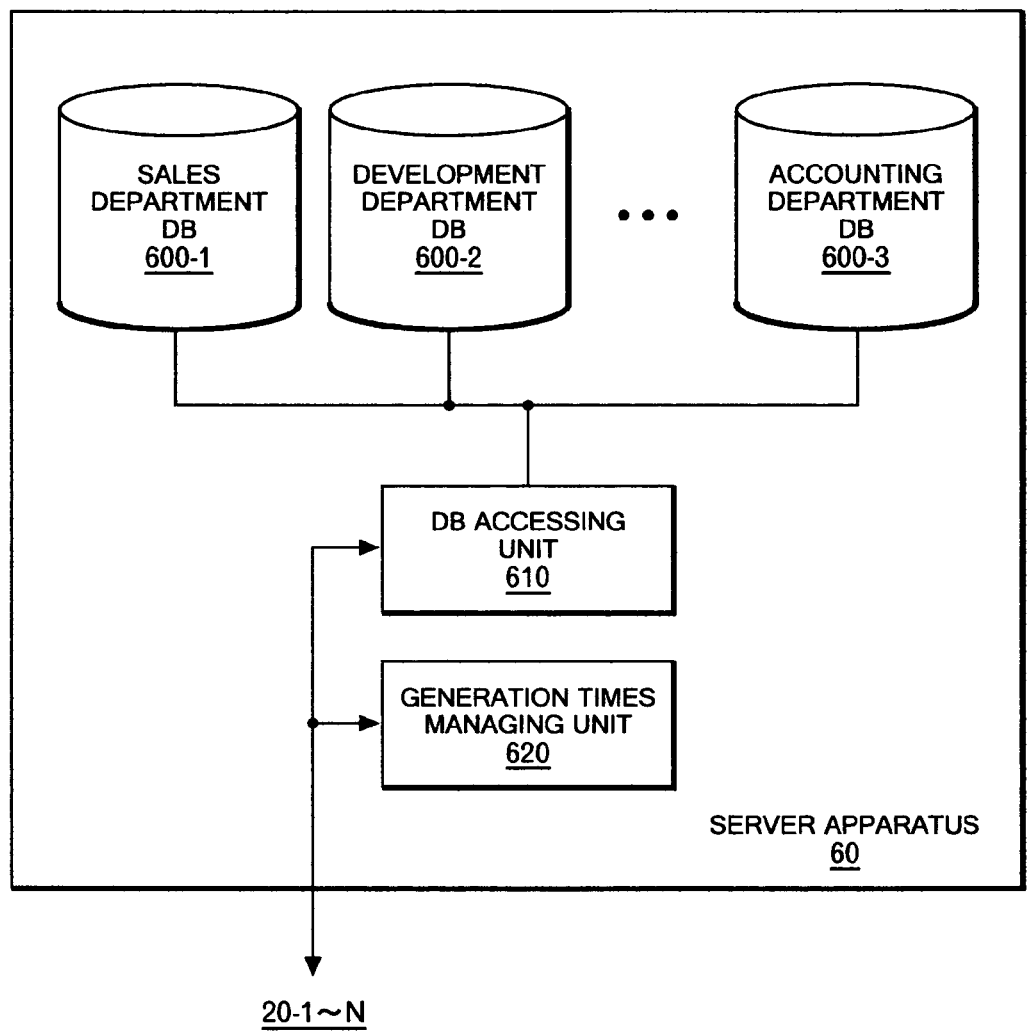
FIG. 6 shows a functional configuration of a server apparatus 60.

FIG. 6 shows a functional configuration of the server apparatus 60. The server apparatus 60 records databases 600-1 to 600-N, and includes a DB accessing unit 610 and a generation times managing unit 620. Each of the databases 600-1 to 600-N records information on a category to which the each corresponds. For example, the database 600-1 records information such as data of a sales department of a certain company, the database 600-2 records information such as data of a development department thereof, and the database 600-3 records information such as data of an accounting department thereof. In each of the databases 600-1 to 600-N, access rights defining users authorized to access the each are set up.

In response to a request received from each of the information processing apparatuses 20-1 to 20-N, the DB accessing unit 610 accesses the databases 600-1 to 600-N, and returns a result of the access. At this time, the DB accessing unit 610 performs access control in accordance with the access rights. Additionally, the generation times managing unit 620 manages, for each of the subject information, a number of times when management information indicating that the subject information should be managed confidentially in any one of the information processing apparatuses 20-1 to 20-N. That is, for example, the generation times managing unit 620 increases the managed number of times based on a notification received from any one of the information processing apparatuses 20-1 to 20-N. Moreover, the generation times managing unit 620 returns the managed number of times in response to a request from any one of the information processing apparatuses 20-1 to 20-N.

Figure 7:
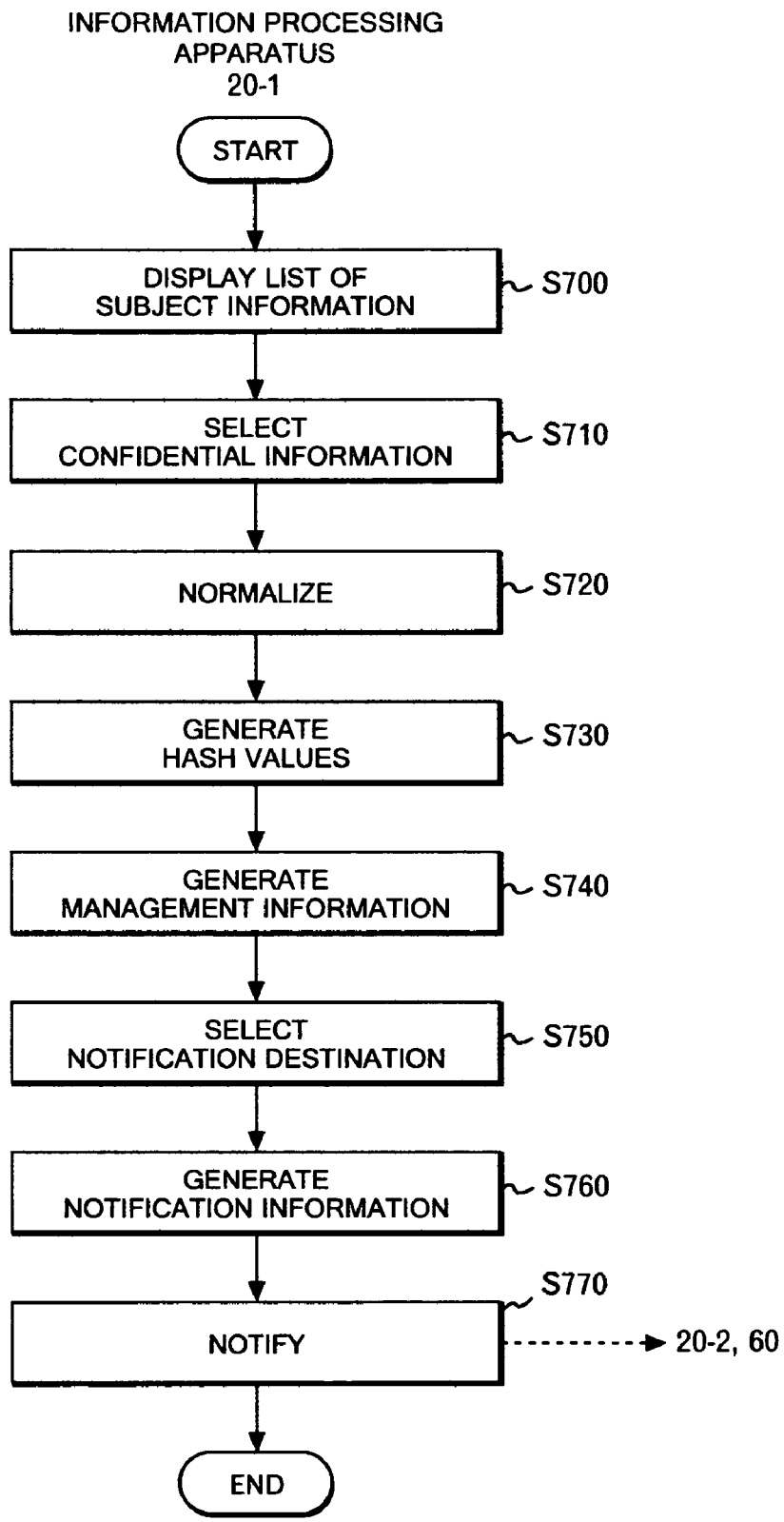
FIG. 7 shows a flowchart of a processing where the information processing apparatus 20-1 notifies another information processing apparatus of management information by becoming a starting point of the notification.

FIG. 7 shows a flowchart of a processing in which the information processing apparatus 20-1 notifies management information, as a starting point. The generating unit 210 displays a list of the subject information recorded in the recording unit 200 (S700). For example, the generating unit 210 may detect only subject information containing personal information from among the subject information recorded in the recording unit 200, and may display the detected subject information. Subsequently, the generating unit 210 selects, as confidential information which should be managed confidentially, the subject information selected by a user from the displayed list (S710).

Thereafter, the generating unit 210 normalizes the selected confidential information. Specifically, the generating unit 210 may detect only personal information out of the confidential information recorded in the recording unit 200, and may treat the personal information as the normalized confidential information. A specific example thereof is shown in FIG. 10.

FIG. 10 shows the specific example of the normalization of information (a first example). A part (a) in FIG. 10 shows a specific example of a content of the confidential information in a case where the confidential information is a text file. A name "ICHIRO TANAKA", an address "MINATO-KU, TOKYO", and a telephone number "03-1234-56XX" are successively written therein.

A part (b) in FIG. 10 shows a specific example of a content of the confidential information in a case where the confidential information is a tabular format file. The name "ICHIRO TANAKA" is written in a column for "name"; the address "MINATO-KU, TOKYO" in a column for "address"; and the telephone number "03-1234-56XX" in a column for "telephone number". The generating unit 210 can generate the same confidential information even when normalizing a file in any one of these formats. A part (c) in FIG. 10 shows one example of the normalized confidential information. The personal information shown in the parts (a) and (b) is recorded after being classified into information items which are "last name", "first name", "address" and "telephone number".

The description returns to FIG. 7. Subsequently, the generating unit 210 generates a hash value of the confidential information (S730). The hash value may be calculated for the confidential information itself, may be calculated for the normalized confidential information, or may be calculated for each of the information items. Subsequently, the generating unit 210 generates the management information indicating that the confidential information should be managed confidentially (S740). Subsequently, based on the history of accesses to the confidential information recorded in the recording unit 200, or based on the access rights thereto, the selecting unit 220 selects, as a notification destination of the management information, users able to access the confidential information.

The notifying unit 230 generates notification information indicating a group of users already notified of the management information (S760). In the example of this drawing, only identification information on the user of the information processing apparatus 20-1 is contained in this notification information. It is desirable that this identification information be information, such as a hash value of an electronic mail address of the user, which is obtained through a one-way function. Thereby, it can be made more difficult to leak information on who retain confidential information, whereby the confidential information can be managed still more strictly.

Then, the notifying unit 230 notifies the users selected by the selecting unit 220 of the hash value of the confidential information, in association with the management information that the confidential information should be managed confidentially and with the notification information. Specifically, this notification may be realized by automatically transmitting an electronic mail. A notification destination in the example of this drawing is assumed to be the user of the information processing apparatus 20-2. Additionally, regardless of who is the notification destination, the notifying unit 230 may further notify the server apparatus 60 of these information.

Figure 8:
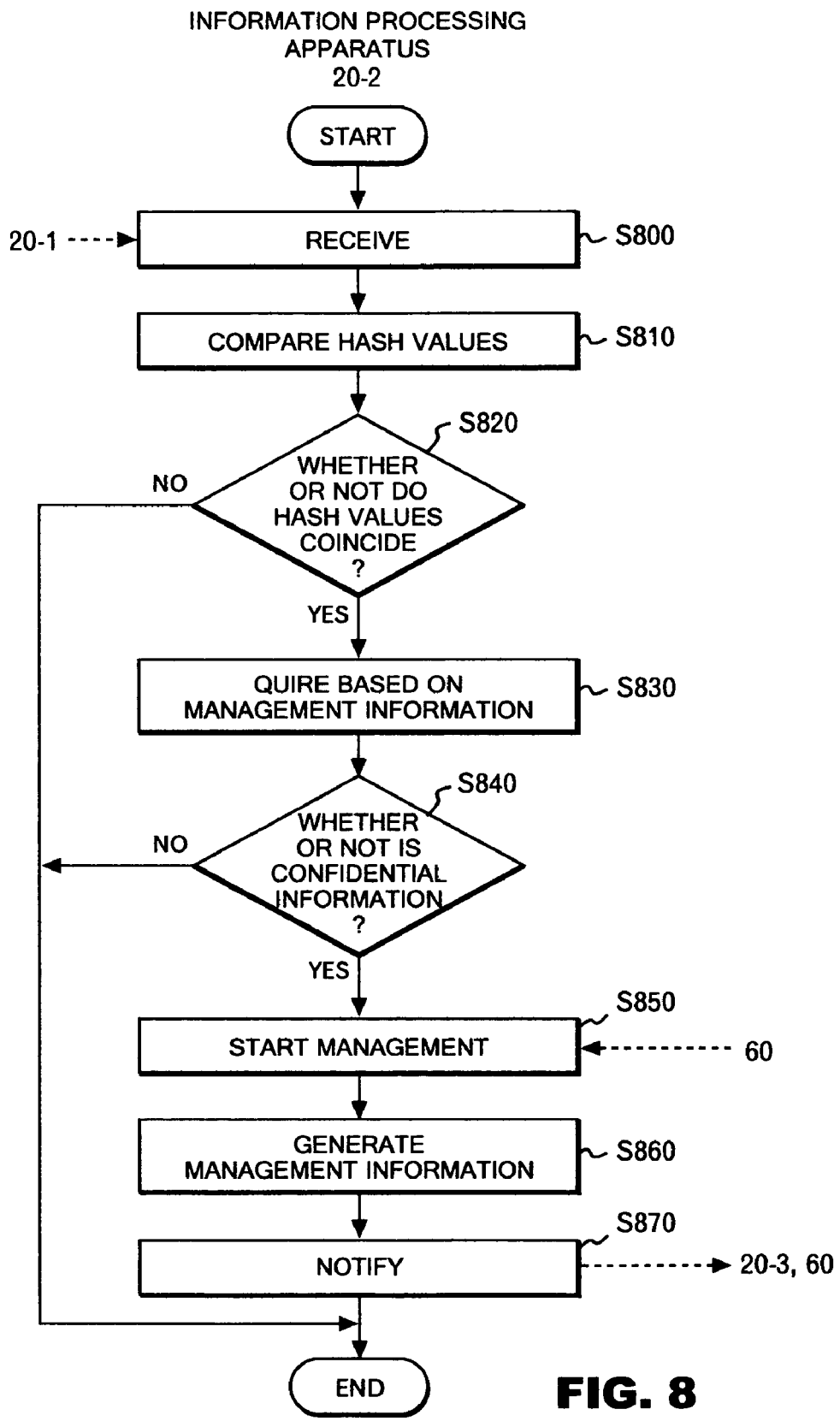
FIG. 8 shows a flowchart of a processing where the information processing apparatus 20-2 forwards management information.

FIG. 8 shows a flowchart of a processing where the information processing apparatus 20-2 forwards management information. The receiver 240 receives, from the notifying unit 230 of the information processing apparatus 20-1, management information of confidential information in association with a hash value of the confidential information (S800). The receiver 240 may receive a hash value of the normalized confidential information instead of the hash value of the confidential information itself. Moreover, the receiver 240 may receive each of a plurality of hash values respectively corresponding to a plurality of information items contained in the confidential information. Additionally, the receiver 240 may receive hash values only with respect to predetermined information items among the information items contained in the confidential information. In this case, in association with the hash value, the receiver 240 may receive identification information of the information items for which the hash value has been calculated. This identification information is, for example, titles of items of personal information (for example, "address", "telephone number", "name" or the like).

In response to reception by the receiver 240 of the management information of the confidential information, the comparing unit 250 compares a hash value of subject information recorded in the recording unit 200 with the received hash value (S810). Specifically, the comparing unit 250 normalizes a file recorded in the recording unit 200, and compares a hash value of the normalized file with the received hash value. In more detail, the comparing unit 250 may convert the file recorded in the recording unit 200 into a predetermined standard format, and may compare a hash value for the converted file and the received hash value with each other. Furthermore, the comparing unit 250 may detect personal information in the subject information recorded in the recording unit 200, and compare a hash value of the detected personal information with the received hash value.

For example, the details thereof are shown in FIG. 10. The comparing unit 250 may normalize the subject information by converting the subject information into a predetermined file format for recording the personal information, when the subject information is either a text format file or a tabular format file. In this case, even if various kinds of information are written in the text format file, only personal information is detected and is recorded in the file after normalization. Still another example is shown in FIG. 11.

FIG. 11 shows the specific example of the normalization of information (a second example). A part (a) shows an example of a screen display at the time of changing a password used for logging into a certain information processing system. A part (b) shows an example of a screen display at the time of changing a password used for logging into another information processing system. These screen displays are different by respective information processing apparatuses. The comparing unit 250 normalizes the information displayed on these screens based on a language processing technique. For example, both of these screen displays show information indicating that a password has been changed, and that the changed password is "yyyy." Additionally, by using a thesaurus or the like, the comparing unit 250 may detect that "PASUWAADO (password in Japanese)" and "PASSWORD" are both an expression indicating a password. Thus, as shown in a part (c), information on an ID and the changed password can be obtained as normalized information.

In addition, for another example, the comparing unit 250 may calculate a hash value for each of information items of the subject information recorded in the recording unit 200, and may compare the respective calculated hash values and received hash values item by item. A specific example thereof is shown in FIG. 12.

FIG. 12 shows the specific example of processing in S810 for comparing whether hash values of information coincide with each other. With respect to hash values received by the receiver 240, a part (a) shows a specific example of confidential information for which the hash value is calculated. In reality, a content of this confidential information cannot be seen on the information processing apparatus 20-2 side. In this drawing, the example of this content is shown for the purpose of explanation.

A part (b) shows a specific example of the subject information recorded in the recording unit 200. As shown in the parts (a) and (b), the confidential information and the subject information concurrently contain the same last names, the same addresses, and the same telephone numbers. On the other hand, while the confidential information contains "SAITO" as the last name of Mr. Ichiro Saito, the management information contains "SAITOU" as the last name of Mr. Ichiro Saito. Thus, even when the confidential information and the management information are assumed to contain the same information, in some cases, these information differs from each other due to a difference in written expression.

Additionally, a driver's license ID of Mr. Jiro Saito is not contained in the subject information while being contained in the confidential information. In some cases, necessary items of personal information vary depending on usage. As shown in this example, there is a case where recorded items are different from each other even regarding the same person. So as to smooth out such a difference, the comparing unit 250 in this example calculates a hash value for each of information items, and uses the calculated hash values as comparison subjects. For example, the comparing unit 250 calculates a hash value of each of information items which are "last name", "first name", "address", "telephone number", and "driver's license ID", and then, respectively compares each of the calculated hash values with each of the received hash values in terms of the information items.

As a result, regarding Mr. Ichiro Saito, since the "last name" is different between the confidential information and the subject information, the comparing unit 250 determined that 4 items out of the whole 5 items coincide with each other. Besides, regarding Mr. Jiro Saito as well, since the "driver's license ID" is different between the confidential information and the subject information, the comparing unit 250 determines that 4 items out of the whole 5 items coincide with each other. Then, on condition that, with respect to a predetermined criteria number or more of the items, the hash values coincide with each other, the comparing unit 250 determines that the confidential information and the subject information coincide with each other. For example, if the predetermined criteria number is 4, since a number of coinciding items is 4 in terms of both of Mr. Ichiro Saito and Mr. Jiro Saito, the comparing unit 250 can determine these confidential information and subject information to coincide with each other.

Instead of this, the comparing unit 250 may calculate a hash value for predetermined information items in the subject information recorded in the recording unit 200, and compare the calculated hash values and the received hash values. These predetermined information items may be identified by identification information of the received information items, or may have been predetermined in advance. That is, for example, on the assumptions that written expressions for telephone number are standardized and that it is rare for an individual to have a plurality of telephone numbers, the comparing unit 250 may calculate hash values of the information items of telephone number, and may compare the calculated hash values and the received hash values.

In addition to this, the comparing unit 250 may normalize the subject information for each of the information items. For example, a telephone number is expressed as "03-1234-56XX" in some cases, and as "(03)1234-56XX" in other cases. The comparing unit 250 normalizes the information items of telephone number by converting a plurality of thus different written expressions for telephone number into one predetermined one. Then, the comparing unit 250 uses the normalized information items as comparison subjects. As for still another example, the aforementioned last name "SAITO" is written, in an expression in Roman letters, as "SAITO" in some cases, or as "SAITOU" in other cases. The comparing unit 250 normalizes information items for last name by converting a plurality of thus different written expressions in Roman letters into one predetermined one such as "SAITO". Thereafter, the comparing unit 250 uses the normalized last names as comparison subjects. As described in the foregoing examples, it is possible to more accurately determine a coincidence between the information by normalizing each of the information items.

The description returns to FIG. 8. The generating unit 210 determines whether the hash values compared by the comparing unit 250 coincide with each other (S820). For example, in a case where a hash value is generated for each of the information items, on condition that, with respect to a predetermined number or more of items, the hash values coincide with each other, the generating unit 210 may determine that these hash values of the confidential information and of the subject information coincide with each other.

On condition that the hash values coincide with each other (S820), based on the received management information, the generating unit 210 makes an inquiry to the user about whether the subject information should be managed confidentially (S830). An example of a screen display for this inquiry is shown in FIG. 9.

FIG. 9 shows the example of the screen display at the time of making the inquiry about whether the subject information should be managed confidentially, in S830. As shown in this example, the generating unit 210 may list the subject information on which hash values coincide with each other. That is, since a hash value of a file "DOCA.TXT" and a received hash value coincide with each other, the generating unit 210 displays the file "DOCA.TXT" to the user. Furthermore, since a hash value of a file "DOCB.TXT" and a received hash value coincide with each other, the generating unit 210 displays the file "DOCB.TXT" to the user.

In addition to subject information such as a file name, the generating unit 210 may display information such as a percentage of personal information contained in the subject information. Thereby, it becomes possible to support selection of confidential information by the user. Moreover, the generating unit 210 may display the subject information, of which the hash values coincide with each other, prioritizing in descending order of number of times when the management information indicating that the subject information should be managed confidentially has been generated. For example, a number of times when "DOCA.TXT" has been managed confidentially is 5, there is no time when "DOCB.TXT" has been managed confidentially, and these numbers of times are cumulative totals of the information processing apparatuses 20-1 to 20-N. These numbers of times are managed by, for example, the generation times managing unit 620 of the server apparatus 60. Thereby, the user can determine, with reference to opinions of the other users, whether each of the subject information should be managed confidentially.

The description returns to FIG. 8. On condition that an instruction that the subject information should be managed confidentially has been inputted from the user (S840: YES), the generating unit 210 generates management information indicating that the subject information should be managed confidentially, based on the instruction (S850). Additionally, on condition that management information, which indicates that the subject information should be deleted, has been received, the generating unit 210 may generate management information indicating that the confidential information should be deleted.

Subsequently, the managing unit 260 starts to manage the subject information recorded in the recording unit 200 (S860). For example, the managing unit 260 may record the subject information in association with the management information indicating that the subject information should be managed confidentially. For another example, the managing unit 260 may delete the subject information, further, on condition that a predetermined period of time has passed since the management information was received by the receiver 240. Additionally, the managing unit 260 may delete the subject information, on condition that the management information received by the receiver 240 contains an instruction indicating that the subject information should be deleted. Moreover, the managing unit 260 may delete the subject information from the recording unit 200, on condition that the user of the information processing apparatus 20-2 has received a carbon copy of the subject information which is an electronic mail. Preferably, the managing unit 260 performs each of these processings, on condition of authorization by the user.

Subsequently, the notifying unit 230 notifies another information processing apparatus of the management information in association with the hash values of the subject information (S870).

Figure 13:
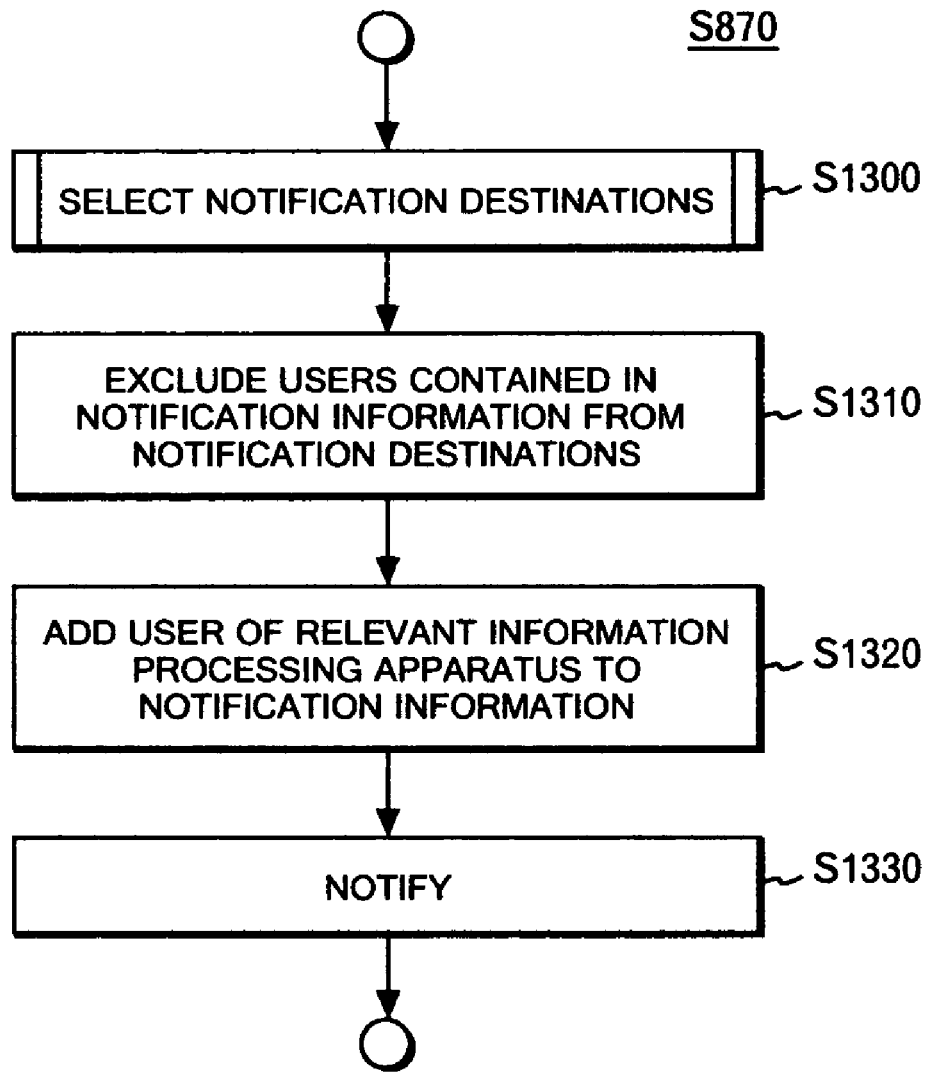
FIG. 13 shows a specific example of a processing in S870.

FIG. 13 shows a specific example of the processing in S870. Based on a history or access rights recorded in the recording unit 200, the selecting unit 220 selects, as notification destinations, users able to access the subject information corresponding to the history or access rights (S1300). Then, the selecting unit 220 excludes users indicated by the notification information 520 from a group of the thus selected users (S1310). The selecting unit 220 generates new notification information by adding the user of the information processing apparatus 20-2 to the received notification information 520 (S1320). Then, the selecting unit 220 notifies of this generated notification information an information processing apparatus of the above selected users (S1330). It does not matter that this notification specifies an information processing apparatus as the notification destination. For example, the selecting unit 220 may give notice of this notification information by an electronic mail addressed to a user of the notification destination.

Figure 14:
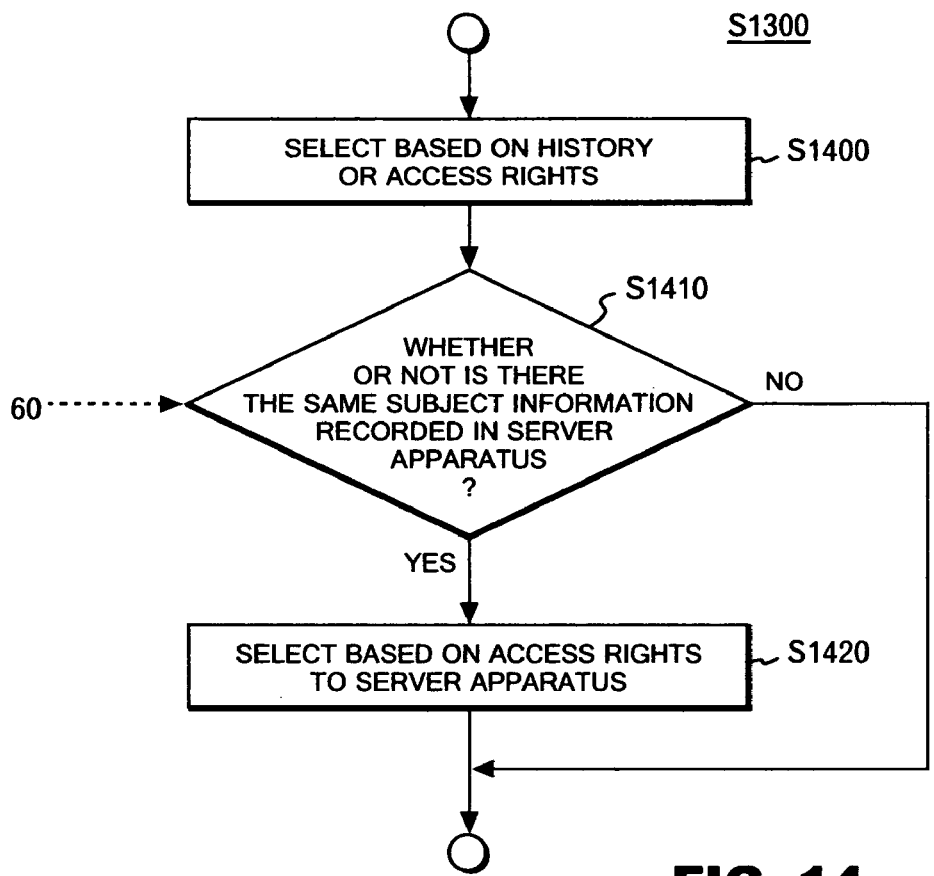
FIG. 14 shows a specific example of a processing in S1400.

FIG. 14 shows a specific example of the processing in S1400. Based on the history or access rights recorded in the recording unit 200, the selecting unit 220 selects, as notification destinations, users able to access the subject information corresponding to the history or access rights (S1400). The following two configurations can be considered for this selecting process.

(i) Utilization of electronic mail

The recording unit 200 records, as the subject information, an electronic mail received by the user of the information processing apparatus 20-2, and records a destination address or a sender of the electronic mail as the history. In most cases, electronic mails transmitted and received remain as histories in information processing apparatuses of a transmitter and a receiver thereof. Therefore, in a case where an electronic mail contains confidential information, there is a high possibility that a transmitter and a receiver thereof also have the confidential information. Accordingly, the selecting unit 220 selects the destination address or the sender of the electronic mail as the user able to access the electronic mail.

(ii) Utilization of shareable storage area

The recording unit 200 has a storage area accessible from other information processing apparatuses through a communication network. Additionally, the recording unit 200 records subject information in the storage area. For the thus configured storages area, access rights defining users authorized to access the storage area are set up. The users authorized to access the storage area are likely to access confidential information recorded in the storage area. Accordingly, based on the access rights set up for the storage area, the selecting unit 220 selects a user authorized to access the storage unit, as the notification destination.

So as to further select other users, the selecting unit 220 may perform the following processing. First, the selecting unit determines whether the same information as the subject information has been recorded in any one of the databases recorded in the server apparatus 60 (S1410). On condition that the same information has been recorded therein (S1410: YES), the selecting unit 220 selects users authorized to access the databases, based on the access rights for the database in the server apparatus 60, (S1420).

Figure 15:
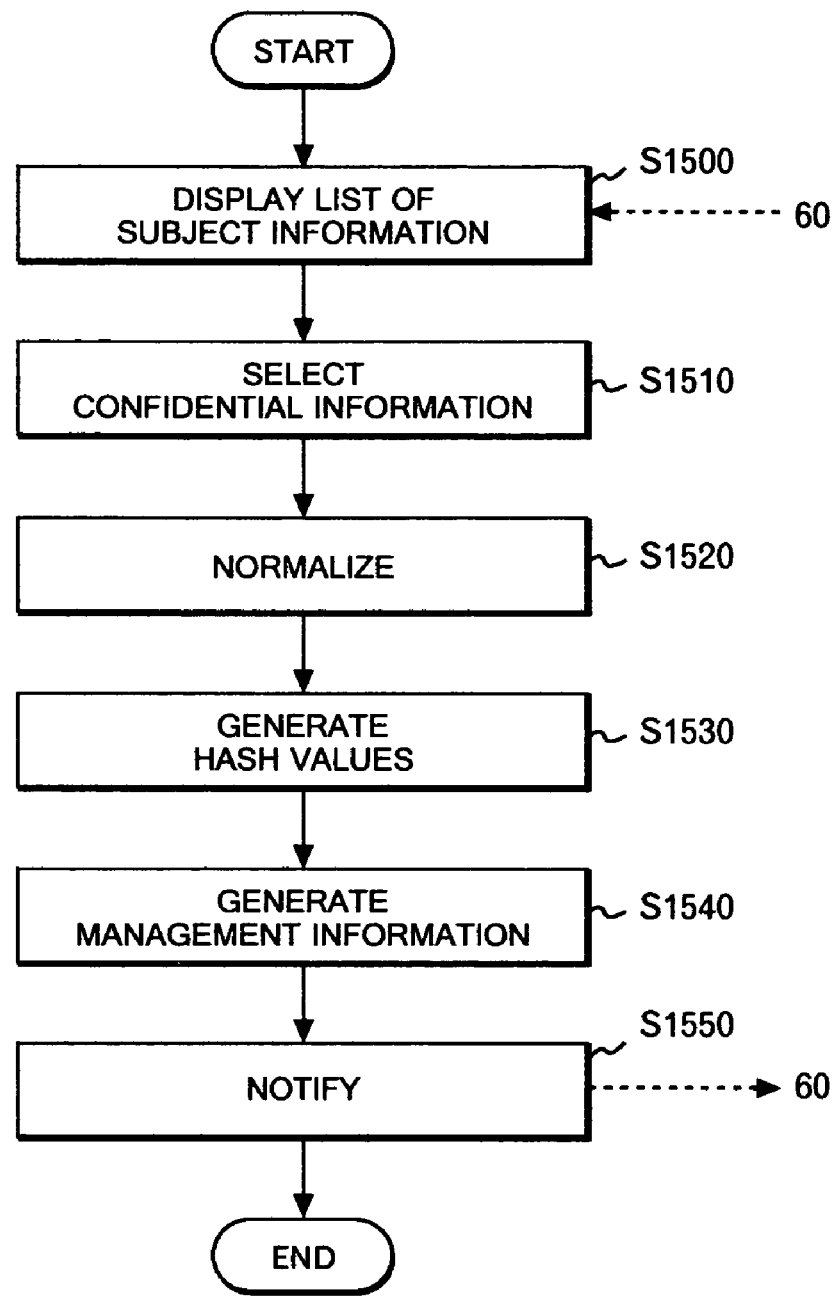
FIG. 15 shows a flowchart of a processing where each of the information processing apparatuses 20-1 to 20-N notifies management information in a modified example of an embodiment.

FIG. 15 shows a flowchart of the processing where, in a modified example of this embodiment, each of the information processing apparatuses 20-1 to 20-N notifies management information. In this modified example, since a functional configuration of each of the information processing apparatuses 20-1 to 20-N is substantially the same as the configuration shown in FIG. 2, a description thereof will be omitted. Additionally, in this modified example, unlike the processing shown in FIG. 8, the respective information processing apparatuses 20-1 to 20-N do not notify each other of confidentiality of information, but the respective information processing apparatuses 20-1 to 20-N notify the server apparatus 60 of the confidentiality. Moreover, each of the information processing apparatuses 20-1 to 20-N receives a notification of confidentiality determined by another information processing apparatus from the server apparatus 60. This processing will be specifically described hereinbelow.

The generating unit 210 displays a list of the subject information recorded in the recording unit 200 (S700). For example, with respect to each of the subject information recorded in the recording unit 200, the generating unit 210 receives from the server apparatus 60 a number of times when management information indicating that each of the subject information should be managed confidentially has been generated. Then, the generating unit 210 displays each of the subject information, prioritizing in descending order of the numbers of times when the management information indicating that the subject information should be managed confidentially has been generated, or in descending order of frequency of managing the subject information.

Subsequently, the generating unit 210 selects, as confidential information that should be managed confidentially, subject information selected by a user from the subject information in the displayed list (S1510). Thereafter, the generating unit 210 normalizes the selected confidential information. The specific example of the normalization is as described with FIG. 10. Then, the generating unit 210 generates a hash value of the confidential information (S1530). The hash value may be calculated for the confidential information itself, may be calculated for the normalized confidential information, or may be calculated for each of information items thereof. Subsequently, the generating unit 210 generates management information indicating that the confidential information should be managed confidentially (S1540). Thereafter, the notifying unit 230 notifies the server apparatus 60 of the hash value of the confidential information in association with the management information indicating that the confidential information should be managed confidentially (S1550).

As described hereinabove, also according to the modified example of this embodiment, each of the users can efficiently determine confidentiality of information with reference to determination results by the other users.

Figure 16:
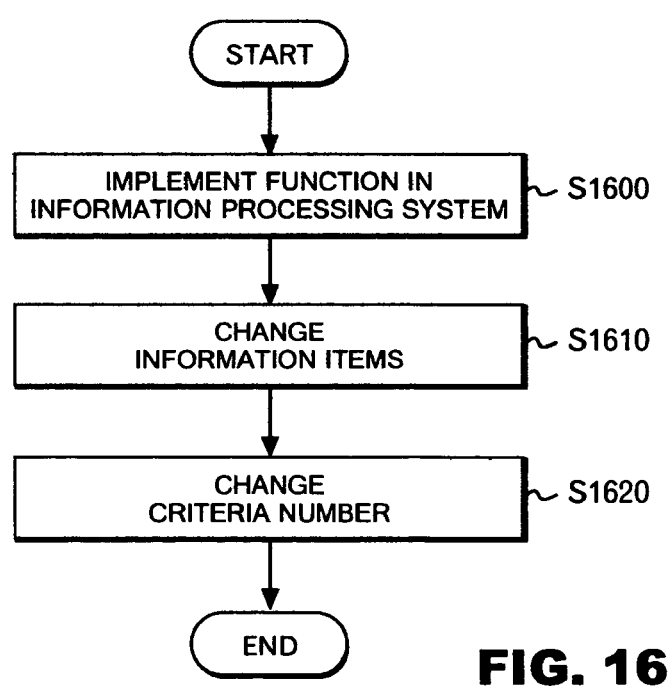
FIG. 16 shows a flow of a service where a service provider implements functions of the embodiment or the modified example thereof.

FIG. 16 shows a flow of a service where a service provider implements functions of this embodiment or the modified example thereof. The service provider implements the hereinabove described functions in the information processing apparatuses 20-1 to 20-N and the server apparatus 60 all of which are in the information processing system 10 (S1600). For example, the service provider may install a program, which is executed by one apparatus and realizes at least one of these functions, into the one apparatus. Thereafter, the service provider changes predetermined information items, of which hash values are to be compared, to other information items in response to an instruction of a user (S1610). For example, the service provider may change the information item, of which the hash values are to be compared, from address to telephone number, by reimplementing the functions of the comparing unit 250. In response to instructions of the user, the service provider changes the criteria number, which is the number of information items coinciding with each other, used for determining whether subject information and confidential information coincide with each other. For example, by decreasing a criteria number from 3 to 2, more subject information likely to be confidential information are displayed to the user, and thereby security can be strengthened.

Figure 17:
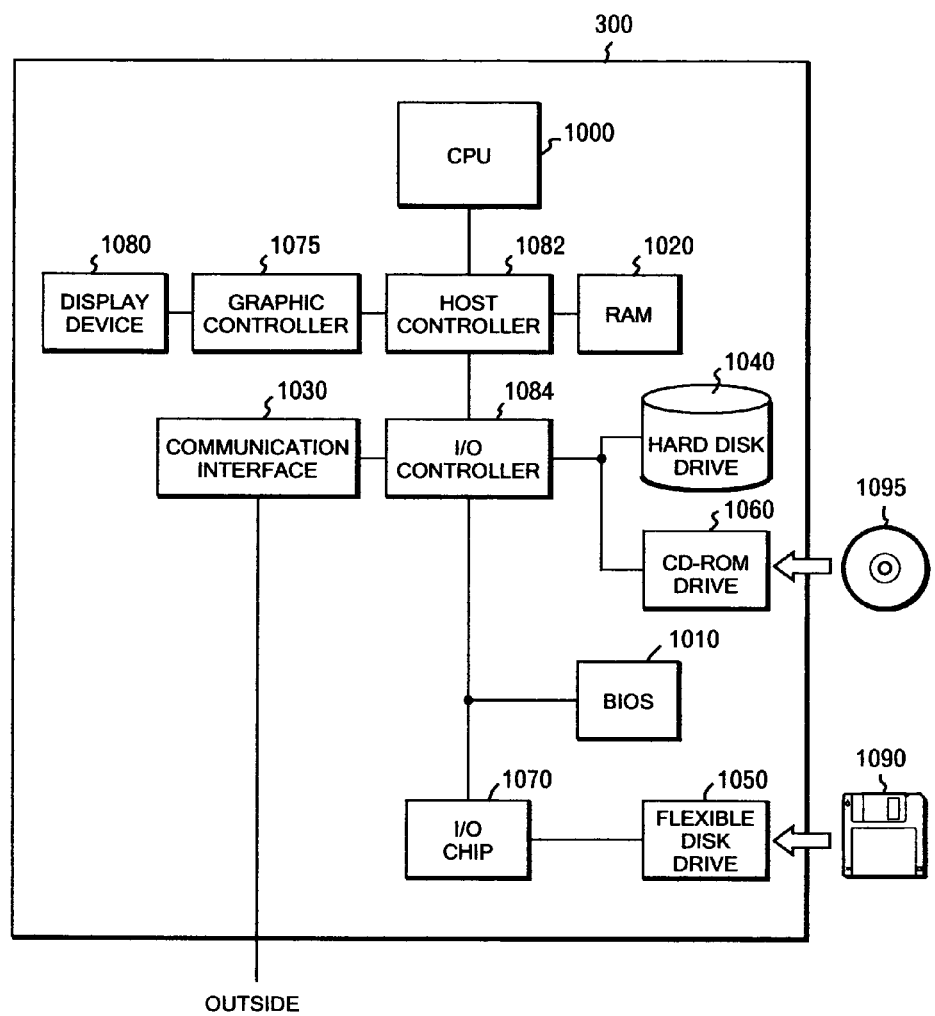
FIG. 17 shows an example of a hardware configuration of an information processing apparatus 300 which functions as the information processing apparatus 20-1 in the embodiment or the modified example thereof.

FIG. 17 shows an example of a hardware configuration of an information processing apparatus 300 which functions as the information processing apparatus 20-1 in this embodiment or the modified example thereof. The information processing apparatus 300 includes: a CPU peripheral unit having a CPU 1000, a RAM 1020, and a graphic controller 1075 all of which are connected to one another through a host controller 1082; an I/O unit having a communication interface 1030, a hard disk drive 1040, and a CD-ROM drive 1160 all of which are connected to the host controller 1082 through an I/O controller 1084; and a legacy I/O unit having a BIOS 1010, a flexible disk drive 1050, and an I/O chip 1070 all of which are connected to the I/O controller 1084.

The host controller 1082 connects the RAM 1020 to the CPU 1000 and graphic controller 1075 which access the RAM 1020 at a high transfer rate. The CPU 1000 operates based on programs stored in the BIOS 1010 and RAM 1120 to control each section of the apparatus. The graphic controller 1075 acquires image data on a frame buffer provided in the RAM 1020, the image data being generated by the CPU 1000 or the like. The graphic controller 1075 causes the image data to be displayed on a DISPLAY DEVICE 1080. Alternatively, the graphic controller 1075 may have a frame buffer in which the image data generated by the CPU 1000 or the like is stored.

The I/O controller 1084 connects the host controller 1082 to the communication interface 1030, hard disk drive 1040, and CD-ROM drive 1060 all of which are relatively fast I/O devices. The communication interface 1030 communicates with external apparatuses through a network. Programs and data used in the information processing apparatus 300 are stored in the hard disk drive 1040. The CD-ROM drive 1060 reads programs or data from the CD-ROM 1095, and provides them to the RAM 1020 or hard disk drive 1040.

The I/O controller 1084 is connected to the BIOS 1010, and to relatively slow I/O devices such as the flexible disk drive 1050 and I/O chip 1170. In the BIOS 1010, there are stored a boot program executed by the CPU 1000 during the startup process of the information processing apparatus 300, and programs and the like which are dependent on the hardware of the information processing apparatus 300. The flexible disk drive 1050 reads programs or data from the flexible disk 1090, and provides them to the RAM 1020 or hard disk drive 1040 through the I/O chip 1070. The I/O chip 1070 connects various I/O devices through the flexible disk drive 1050, and for example, a parallel port, a serial port, a keyboard port, a mouse port, and the like.

A program provided to the information processing apparatus 300 is stored in a recording medium such as the flexible disk 1090, the CD-ROM 1095, or an IC card, and then provided by a user. The program is read from the recording medium through at least any one of the I/O chip 1070 and I/O controller 1084, and then the program is installed into the information processing apparatus 300 to be executed. Since operations which the program causes the information processing apparatus 300 to perform are the same as operations in the information processing apparatus 20-1 which have been described with FIGS. 1 to 15, a description thereof will be omitted.

The programs indicated above may be stored in an external recording medium. As the recording medium other than the flexible disk 1090 or CD-ROM 1095, it is possible to use: an optical recording medium such as a DVD or a PD; a magneto-optical recording medium such as an MD; a tape medium; a semiconductor memory such as an IC card; or the like. Alternatively, the program may be provided to the information processing apparatus 300 through a network by using a storage device, such as a hard disk or a RAM, which is provided in a server system connected to a dedicated communication network or the Internet.

According to the aforementioned embodiment and the modified example thereof, in a presently prevailing environment where a plurality of information processing apparatuses are connected to each other, it becomes possible to efficiently manage confidential information recorded dispersedly in the respective information processing apparatuses. Additionally, since a notification destination of management information on confidentiality is defined based on access rights thereto and the like, it becomes possible to strictly maintain confidentiality of information, and also to reduce network traffic. Furthermore, in the embodiment, since the information processing apparatuses exchange management information on confidentiality with each other, it becomes possible to make network traffic to be less concentrated on a server apparatus.

In addition, according to the present invention, it become possible to efficiently manage confidential information recorded in each of a plurality of information processing apparatuses.

While the present invention has been described with the embodiment, the technical scope of the present invention is not limited to the scope of descriptions in the aforementioned embodiment. It is obvious that various changes or improvements can be added to the aforementioned embodiment, as is well known to those skilled in the art. It is obvious from the scope of claims that embodiments in which such changes or improvements are added can also be included in the technical scope of the present invention.

Although the preferred embodiment of the present invention has been described in detail, it should be understood that various changes, substitutions and alternations can be made therein without departing from spirit of the inventions as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

That which is claimed is:

1. A method of managing confidentiality of user information by use of an apparatus which manages confidentiality of the user information, wherein the apparatus includes a recording unit operable to record information in association with any one of a history of users having accessed the user information, and access rights defining users authorized to access the user information, the method comprising the steps of:

recording user information, the user information containing a plurality of information items, in association with any one of a history of users having accessed the user information, and access rights defining users authorized to access the user information;

receiving management information, the management information indicating whether the user information should be managed confidentially, in association with a plurality of hash values of the user information, each of the received plurality of hash values corresponding to a respective information item contained in the user information;

comparing hash values of the recorded user information with the received hash values in response to receipt of management information of the user information, wherein comparing hash values further comprises calculating hash values for each of the information items of the recorded user information and comparing the respective calculated hash values with the respective received hash values for each information item;

generating management information indicating whether the user information should be managed confidentially from a certain user, based on the received management information, on condition that, with respect to a predetermined criteria number or more of the information items, the compared hash values coincide with each other;

selecting users able to access the user information, based on any one of the history and the access rights recorded in the recording unit;

notifying the selected users of the generated management information in association with identification information of the user information, in order to cause the user information to be managed by the selected users in accordance with the generated management information; and changing the predetermined criteria number in response to instructions of users.

2. An apparatus which manages confidentiality of information, comprising:

a recording unit operable to record user information in association with any one of a history of users having accessed the user information, and access rights defining users authorized to access the user information;

a generating unit operable to generate management information indicating whether the user information should be managed confidentially from a certain user;

a selecting unit operable to select users able to access the user information, based on any one of the history and the access rights; and a notifying unit operable to notify the selected users of the generated management information in association with identification information of the user information, wherein the notifying unit notifies the selected users of hash values, which are generated from the user information through a one-way function, as the identification information of the user information;

a receiver operable to receive the management information of the information in association with hash values of the user information, from the notifying unit of another information processing apparatus provided corresponding to another user; and a comparing unit operable to compare hash values of the user information recorded in the recording unit with the received hash values in response to receipt of the management information of the user information in the receiver, wherein, on condition that the hash values compared by the comparing unit coincide with each other, the generating unit generates the management information indicating whether the user information should be managed confidentially, based on the received management information.

3. The apparatus according to claim 2, wherein the notifying unit notifies the selected users of the management information in order to cause the user information to be managed by the selected users corresponding to the management information.

4. The apparatus according to claim 2, wherein,
the receiver further receives notification information indicating a group of users already notified of the management information, in association with the management information of the user information;
the selecting unit excludes the users indicated by the notification information from a group of the users selected as the users able to access the user information; and
the notifying unit notifies the users selected by the selecting unit of the generated management information, in association with both the notification information obtained by adding a user of the apparatus to the received notification information, and the hash values of the user information.

5. The apparatus according to claim 4, wherein,
the receiver receives hash values of identification information on the users already notified of the management information, as the notification information, in association with the management information of the user information;
the selecting unit calculates hash values of identification information on each of the selected users, and excludes users from notification destinations, on the condition that the calculated hash values of the users coincide with any one of the hash values received by the receiver; and
the notifying unit notifies the selected users of the notification information in association with the hash values of the user information, the notification information being obtained by adding the hash values of the identification information on the user of the apparatus to the received notification information.

6. The apparatus according to claim 2, further comprising a managing unit operable to delete information from the recording unit on condition that management information received by the receiver indicates that the user information should be managed confidentially, and additionally, on condition that a predetermined period of time passes after the management information is received by the receiver.

7. The apparatus according to claim 2, wherein the recording unit records an electronic mail received by a user of the apparatus as the user information, and has destination address of the electronic mail recorded as the history, and
the apparatus further comprising a managing unit operable to delete the user information from the recording unit on condition that the management information indicates that the user information should be managed confidentially, and additionally on condition that the user of the apparatus has received a carbon copy of the user information that is the electronic mail.

8. The apparatus according to claim 2, wherein,
the recording unit has a file recorded therein as the user information; and
the comparing unit converts the file, which is recorded in the recording unit, into a file in a predetermined standard file format, and compares hash values of the file obtained by the conversion with the received hash values.

9. The apparatus according to claim 2, wherein,
the recording unit has the user information containing personal information recorded therein; and
the comparing unit detects the personal information from among the user information recorded in the recording unit, and compares hash values of the personal information with the received hash values.

10. The apparatus according to claim 2, wherein,
the recording unit has the user information, which contains a plurality of information items, recorded therein;
the receiver receives each of a plurality of hash values respectively corresponding to the plurality of information items;
the comparing unit calculates a hash value for each of the information items regarding the information recorded in the recording unit, and compares the calculated hash value with the received hash value item by item; and
the generating unit generates the management information of the user information recorded in the recording unit, based on the received management information, on condition that, with respect to a predetermined number or more of the items, the hash values coincide with each other.

11. The apparatus according to claim 2, wherein,
the recording unit has first information, which contains a plurality of information items, recorded therein;
the receiver receives hash values of predetermined information items in second information; and
the comparing unit calculates hash values of the predetermined information items of the first information recorded in the recording unit, and compares the calculated hash values with the received hash values.

12. The apparatus according to claim 11, wherein,
the receiver further receives identification information of the information items of which the hash values are calculated, in association with the received hash value; and
the comparing unit calculates hash values of the information items, which are identified by the received identification information, in the user information recorded in the recording unit, and compares the calculated hash values with the received hash values.

13. The apparatus according to claim 2, wherein,
the receiver receives a notification as the management information of the user information, the notification indicating that the user information should be deleted because of high confidentiality of the user information, from the notifying unit of the other apparatuses;
the apparatus, further comprising a managing unit operable to delete the user information recorded in the recording unit, on condition that the notification indicating that the user information should be deleted is received, and additionally on condition that the hash values compared by the comparing unit coincide with each other; and
the apparatus, wherein the generating unit generates the management information indicating that the user information should be deleted because of the high confidentiality of the user information, on condition that a notification indicating that the user information should be deleted, and additionally on condition that the hash values compared by the comparing unit coincide with each other.

14. The apparatus according to claim 2, wherein,
the recording unit records, as the user information, an electronic mail received by a user of the apparatus, and has any one of a destination address and a sender of the electronic mail recorded as the history; and
the selecting unit selects, as a user able to access the user information, any one of the destination address and the sender of the electronic mail.

15. The apparatus according to claim 2, wherein,
the recording unit includes a storage area accessible from the other apparatuses through a communication network, and has the user information recorded in the storage area; and the selecting unit selects users authorized to access the storage area, based on access rights set up for the storage area.

16. The apparatus according to claim 2, wherein,
the apparatus is connected to a server apparatus having at least one database recorded therein through a communication network; and
on condition that the user information recorded in the recording unit is contained in any one of the databases recorded in the server apparatus, the selecting unit further selects a user authorized to access the databases.

17. A system which includes a plurality of apparatuses respectively used by different users, and which manages confidentiality of user information recorded in the plurality of apparatuses, each of the plurality of apparatuses comprises:
a recording unit operable to record information in association with any one of a history of users having accessed the user information, and access rights defining users authorized to access the user information;
a receiver operable to receive, from another one of the apparatuses provided corresponding to different users, management information indicating whether the user information should be managed confidentially, in association with hash values of the user information;
a comparing unit operable to compare hash values of information recorded in the recording unit with the received hash values in response to receipt of management information of the user information in the receiver;
a generating unit operable to generate management information indicating whether the user information should be managed confidentially, based on the received management information, on condition that the hash values compared by the comparing unit coincide with each other;
a selecting unit operable to select users able to access the user information, based on any one of the history and access rights; and
notifying unit operable to notify the selected users of the generated management information in association with identification information of the user information.

18. The system according to claim 17, further comprising a server apparatus which is connected to the plurality of the apparatuses through a communication network, and which is operable to manage the number of times at which management information indicating that each piece of the user information should be managed confidentially is generated in any one of the apparatuses, for each piece of the information, wherein,
the recording unit has plural pieces of the user information recorded therein;
the notifying unit further notifies the server apparatus of the management information generated by the generating unit;
the generating unit displays the recorded plural pieces of information, prioritizing in any one of descending order of the number of times at which each piece of the user information is managed by the server apparatus, and descending order of frequency with which each piece of the user information is managed by the server apparatus, and thus causes a user to input whether each of the displayed pieces of the user information should be managed confidentially, hence generating management information on the each displayed piece of the user information based on an instruction inputted from the user.

19. A method for implementing at least any one of functions in one apparatus of a plurality of apparatuses constituting a system, the method comprising:
recording user information, which contains a plurality of information items, in association with any one of a history of users having accessed the user information, and access rights defining users authorized to access the user information;
receiving management information, which indicates whether the user information should be managed confidentially, in association with hash values of the user information, from another one of the apparatuses provided to different users;
comparing hash values of the user information recorded in the recording unit with the received hash values in response to receipt of management information of the user information;
generating the management information indicating whether the user information should be managed confidentially, based on the received management information, on condition that the hash values compared by the comparing unit coincide with each other;
selecting users able to access the user information based on any one of the recorded history and the recorded access rights; and
notifying the users of the generated management information in association with identification information of the user information, in order to cause the user information to be managed by the selected users in accordance with the generated management information.

20. The method according to claim 19, further comprising the steps of:
in the function of receiving hash values, receiving management information indicating whether user information should be managed confidentially from the other apparatuses provided to different users, in association with hash values of predetermined information items of the user information;
in the function of comparing the hash values, calculating hash values for the predetermined information items of the recorded information in response to receipt of the management information of the user information, and comparing the calculated hash values with the received hash values; and
changing the predetermined information items to other information items in response to instructions of the users.

21. The method according to claim 19, further comprising the steps of:
in the function of receiving the hash values, receiving management information indicating whether the user information should be managed confidentially from the other apparatuses provided to different users, in association with each of a plurality of hash values corresponding to respective information items contained in the user information;
in the function of comparing the hash values, calculating hash values for each of the information items of the recorded user information, in response to receipt of management information of the user information, and comparing the respective calculated hash values with the respective received hash values for each information item;

in the function of generating the management information, generating management information indicating whether the recorded information should be managed confidentially, based on the received management information, on condition that, with respect to a predetermined criteria number or more of the information items, the hash values coincide with each other; and changing the predetermined criteria number in response to instructions of the users.

22. The method according to claim 19, wherein the implementing step includes a step of installing a program, which is executed by one apparatus and realizes at least one of the above-mentioned functions, into the one apparatus.

* * * * *